US012656206B2

(12) United States Patent
Tripathy et al.

(10) Patent No.: US 12,656,206 B2
(45) Date of Patent: Jun. 16, 2026

(54) MULTI-DIRECTIONAL OPEN PATH DETECTOR SYSTEM AND METHOD OF USING THE SAME

(71) Applicant: HONEYWELL INTERNATIONAL INC., Charlotte, NC (US)

(72) Inventors: Janmejaya Tripathy, Charlotte, NC (US); Sumit Kulkarni, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 338 days.

(21) Appl. No.: 18/454,524

(22) Filed: Aug. 23, 2023

(65) Prior Publication Data

US 2024/0077377 A1 Mar. 7, 2024

(30) Foreign Application Priority Data

Sep. 7, 2022 (IN) .............................. 202211051141

(51) Int. Cl.
*G01M 3/04* (2006.01)
*F17D 5/00* (2006.01)
(Continued)

(52) U.S. Cl.
CPC .............. *G01M 3/04* (2013.01); *F17D 5/005* (2013.01); *F17D 5/02* (2013.01); *G01M 3/38* (2013.01);
(Continued)

(58) Field of Classification Search
CPC ........... G01M 3/04; G01M 3/38; F17D 5/005; F17D 5/02; G01N 21/01; G01N 21/3504; G01N 21/3518
See application file for complete search history.

(56) References Cited

U.S. PATENT DOCUMENTS 8,269,170 B2 9/2012 Johnson
9,506,804 B2 11/2016 Lu et al.
(Continued)

FOREIGN PATENT DOCUMENTS

CN 113853512 A * 12/2021 .......... G01N 21/255
EP 0018458 A2 11/1980
(Continued)

OTHER PUBLICATIONS

CN-113853512-A, English translation (Year: 2021).*
(Continued)

*Primary Examiner* — Ryan D Walsh
(74) *Attorney, Agent, or Firm* — Alston & Bird LLP

(57) ABSTRACT

Various embodiments are directed to a multi-directional open path detector system comprising: a plurality of transmitters; a receiver configured to receive, for each transmitter, an incoming beam corresponding to a beam signal emitted by a respective transmitter, the receiver comprising: an optical element; at least one detector; and a reflector element in reflective communication with the optical element, wherein for each transmitter: the reflector element is configured to direct the incoming beam towards the optical element, the optical element is configured to redirect the incoming beam towards the at least one detector, and the at least one detector is configured to generate an output signal based at least in part on the incoming beam; and the system further comprising a controller communicably coupled to the at least one detector to generate a detection signal based at least in part on the output signal.

18 Claims, 6 Drawing Sheets

(51) Int. Cl.

| | |
|---|---|
| *F17D 5/02* | (2006.01) |
| *G01M 3/38* | (2006.01) |
| *G01N 21/01* | (2006.01) |
| *G01N 21/3504* | (2014.01) |
| *G01N 21/3518* | (2014.01) |

(52) U.S. Cl.
CPC ......... *G01N 21/01* (2013.01); *G01N 21/3504* (2013.01); *G01N 21/3518* (2013.01)

(56) References Cited

U.S. PATENT DOCUMENTS

| | | | |
|---|---|---|---|
| 10,473,550 B2 | 11/2019 | Li et al. | |
| 2001/0015408 A1* | 8/2001 | Stock ................... | G01N 21/314 |
| | | | 250/338.5 |
| 2012/0140231 A1 | 6/2012 | Knox et al. | |

| | | | | |
|---|---|---|---|---|
| 2019/0366329 A1* | 12/2019 | John | ..................... | G01N 21/01 |

FOREIGN PATENT DOCUMENTS

| | | | | | |
|---|---|---|---|---|---|
| EP | 4060308 A1 | * | 9/2022 | .............. | G01M 3/38 |
| JP | 2019-135471 A | | 8/2019 | | |
| NL | 8503360 A | * | 7/1987 | ......... | G01N 21/3504 |
| WO | WO-2024019029 A1 | * | 1/2024 | ......... | G01N 21/3504 |

OTHER PUBLICATIONS

EP-4060308-A1, English translation (Year: 2022).*
NL-8503360-A, English translation (Year: 1987).*
WO-2024019029-A1, English translation (Year: 2024).*
Extended European Search Report Mailed on Feb. 9, 2024 for EP Application No. 23189732, 9 page(s).

* cited by examiner

MULTI-DIRECTIONAL OPEN PATH DETECTOR SYSTEM AND METHOD OF USING THE SAME

CROSS-REFERENCE TO RELATED APPLICATION

This application claims priority pursuant to 35 U.S.C. 119(a) to Indian Application No. 202211051141, filed Sep. 7, 2022, which application is incorporated herein by reference in its entirety.

FIELD OF THE INVENTION

Various embodiments described herein relate generally to detector systems for detecting the presence of a gas in an area, and more particularly to an open path detector system.

BACKGROUND

Open path detector systems are generally used today to determine the presence of a gas (e.g., hazardous gas) due to leak in various environments, for example, a pipeline environment. In particular, an open path detector system may be used to monitor the presence of a gas in an area based at least in part on attenuation in emitted radiation. Through applied effort, ingenuity, and innovation, Applicant has solved problems relating to open path detector systems by developing solutions embodied in the present disclosure, which are described in detail below.

BRIEF SUMMARY

Various embodiments described herein relate to multi-directional open path detector systems and methods for using the same. Various embodiments are directed to a multi-directional open path detector system comprising: a plurality of transmitters, wherein each transmitter is configured to emit a beam signal in a beam path, and wherein each beam path direction is different for each transmitter of the plurality of transmitters; a receiver at a receiver location, wherein the receiver is positioned in the beam path for each transmitter of the plurality of transmitters and configured to receive, for each transmitter, an incoming beam corresponding to the emitted beam signal by the respective transmitter, the receiver comprising: an optical element; at least one detector; and a reflector element in reflective communication with the optical element, wherein for each transmitter: the reflector element is configured to direct the incoming beam towards the optical element, the optical element is configured to redirect the incoming beam towards the at least one detector, and the at least one detector is configured to generate an output signal based at least in part on the incoming beam; and the multi-directional open path detector system further comprises a controller communicably coupled to the receiver, wherein the controller is configured to generate a detection signal based at least in part on the output signal, wherein the detection signal may be indicative of presence of a detected gas.

In various embodiments, the plurality of transmitters may be spaced circumferentially around the receiver. In various embodiments, the reflector element may comprise a plurality of reflector faces, wherein each transmitter of the plurality of transmitters is aligned with a reflector face of the plurality of reflector faces, and wherein each reflector face is configured to direct the incoming beam from the corresponding transmitter to the optical element.

In various embodiments, the reflector element may comprise a pyramid shape. In various embodiments, the optical element may comprise a concave mirror. In various embodiments, the optical element may comprise a flat mirror. In various embodiments, the plurality of transmitters may be configured to emit the beam signals in a sequential order.

In various embodiments, the receiver may further comprise a beam splitter communicably coupled to the optical element, wherein the beam splitter is configured to split each incoming beam that is redirected towards the at least one detector into a first incoming beam portion and a second incoming beam portion. In various embodiments, the at least one detector may comprise a first detector and a second detector, wherein the first detector is configured to receive a first incoming beam portion having a first wavelength and the second detector is configured to receive a second incoming beam portion having a second wavelength.

In various embodiments, the beam path between the receiver and each transmitter may be a straight beam path. In various embodiments, the beam signal emitted by each transmitter may comprise infrared radiation.

In various embodiments, the output signal generated by the at least one detector may comprise an intensity measure. In various embodiments, the controller may be configured for wireless communication of the detection signal to one or more external devices.

Various embodiments are directed to a receiver for a multi-directional open path detector comprising: at least one detector; a controller communicably coupled to the at least one detector; an optical element; and a reflector element in reflective communication with the optical element, wherein: the reflector element is configured to direct incoming beam from a transmitter towards the optical element; the optical element is configured to redirect the incoming beam towards the at least one detector; the at least one detector is configured to generate an output signal based at least in part on the incoming beam; and the controller is configured to generate a detection signal based at least in part on the output signal, wherein the detection signal may be indicative of presence of a detected gas. In various embodiments, the reflector element may comprise a plurality of reflector faces, wherein each reflector face is configured for being aligned with a transmitter of a plurality of transmitters, and wherein each reflector face is configured to direct the incoming beam from the corresponding transmitter to the at least one detector. In various embodiments, the reflector element may comprise a pyramid shape. In various embodiments, the optical element may comprise a concave mirror. In various embodiments, the optical element may comprise a flat mirror.

Various embodiments are directed to a method for detecting gas in a region, the method comprising: aligning a receiver with a plurality of transmitters; receiving incoming beam from each transmitter of the plurality of transmitters; for each transmitter: redirecting the received incoming beam; and generating a detection signal based at least in part on the redirected incoming beam. In various embodiments, each incoming beam is received sequentially. In various embodiments, each received incoming beam is redirected towards at least one detector. In various embodiments, the incoming beam received from each transmitter may comprise infrared radiation. In various embodiments, the method may further comprise communicating one or more detection signals to one or more external devices.

BRIEF DESCRIPTION OF THE DRAWINGS

Reference will now be made to the accompanying drawings, which are not necessarily drawn to scale, and wherein.

DETAILED DESCRIPTION

Figure 1:
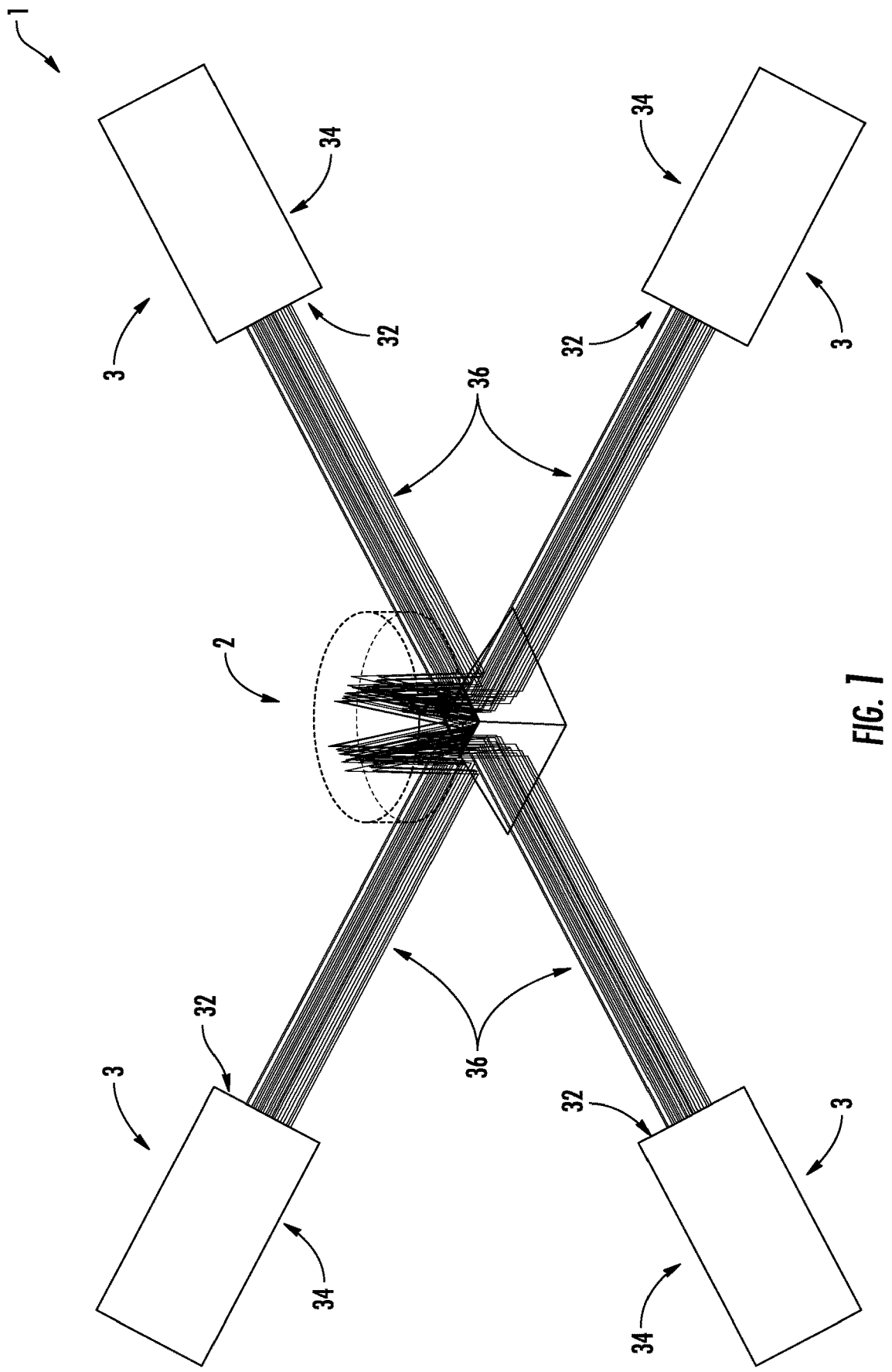
FIG. 1 schematically illustrates an exemplary multi-directional open path detector system in accordance with various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Described herein is a device configured to detect the presence of a gas or gases (e.g., target gas(es)) in an area. As a non-limiting example, various applications may produce, transport, and/or store gas(es) that pose severe environmental and health risks if leaked to the environment undetected. Various gas detector systems may utilize a receiver and a transmitter to detect the presence of target gases based at least in part on the interaction of these gases with a radiation signal traveling through a beam path between the transmitter and receiver. As described herein, however, a gas detector system configured to utilize a receiver and a transmitter to facilitate the determination of the presence of a gas in an area, particularly a large area, may be subject to system inaccuracies caused by a narrow field of view. For example, emitted radiation incident on a receiver may not pass through a target gas (e.g., leaked gas) in a monitored area due at least in part to the narrow field of view of the receiver, thus resulting in inaccurate detection. Additionally, various implementations utilizing multiple receivers and transmitters may be constrained by various variables, including, but not limited to, installation space, increased cost, and increased process and power consumption. Accordingly, a need exists for a gas detection system that is able to efficiently and accurately determine the presence of target gases in an area.

Various embodiments of the present invention described herein include an exemplary multi-directional open path detector system configured to provide multi-path detection that at least efficiently compensates for narrow field of view of receivers, and thus enables a more accurate gas detection. An exemplary multi-directional open path detector system according to various embodiments described herein may comprise a receiver configured to provide a multi-field view, wherein the presence of target gas(es) in an area may be detected based at least in part on radiation beams incident on the receiver from different directions in the monitored area, thus covering/spanning a larger portion of the area.

In various embodiments, an exemplary multi-directional open path detector system may be configured to detect the presence of target gas(es) based at least in part on a determined/measured attenuation in signal intensity of a radiation beam incident on the receiver due to the interference of target gas(es) with the signal. As radiation beam travels through a path that includes a volume of gas (e.g., target gas), certain wavelength(s) may be absorbed by the gas resulting in reduced signal intensity. In various embodiments, an exemplary multi-directional open path detector system of the present invention may be configured to measure the intensity of radiation beams incident on the receiver from multiple directions to determine attenuation in intensity (if any), and may be configured to determine the presence of target gas(es) based at least in part on the determined attenuation in intensity.

In various embodiments, an exemplary receiver as described herein may comprise one or more detectors and a reflector element having a plurality of reflector faces (e.g., receiving faces). The reflector faces may be configured to collect and direct, in conjunction with one or more optical elements, radiation beams (e.g., infrared (IR) radiation beam, light beam, and/or the like) incident on the respective reflector faces towards at least one detector. The incident radiation beams may be emitted from a plurality of transmitters that are each positioned at a distance from the receiver, wherein the receiver is positioned in a beam path for each transmitter of the plurality of transmitters. The transmitters may be positioned at different locations (e.g., receiver location) in the monitored area so as to enable emission of radiation beams from different directions (e.g., different beam path directions). The transmitters may be arranged, oriented, and/or distributed in different configurations relative to one another and/or the receiver. In various embodiments, the distance, arrangement, orientation, and/or distribution of the transmitters may be based at least in part on the configuration of the reflector faces of the reflector element. An exemplary transmitter as described herein may be configured to emit radiation (e.g., infrared (IR), light, and/or the like) having at least a wavelength that is absorbed by a target gas.

In various embodiments, incoming radiation beams corresponding to emitted radiation beam signals may be received (e.g. incident) on the reflector faces of the reflector element in a sequential manner. For example, in various embodiments, emission of radiation signals by the transmitters may be time-delayed so as to enable sequential emission. As noted above, the plurality of reflector faces may be configured to direct the sequentially incident incoming radiation beams to at least one detector via one or more optical elements. For example, in various embodiments, each reflector face may be communicably coupled to (e.g., in reflective communication with) an optical element that is configured to receive incoming radiation beams reflected from the reflector face and redirect the received incoming radiation beam to the at least one detector. In some embodiments, each reflector face may be communicably coupled to a single optical element. In some embodiments, a subset of the reflector faces may be communicably coupled to a particular optical element of a plurality of optical elements.

The at least one detector may be configured to generate, for each received incoming radiation beam, an output signal. In various embodiments, the output signal may represent a signal intensity (e.g., signal strength) for the respective received incoming radiation beam. In various embodiments, the incoming radiation beams incident on the reflector faces are directed to a set of detectors and each detector in the set of detectors may be configured to generate an output signal (e.g., intensity/signal strength) for a respective incoming radiation beam. The generated output signals may be further analyzed and/or processed to generate a detection signal that is indicative of the presence or absence of a target gas (e.g., detected gas). Accordingly, the above described configurations according to various embodiments of the present invention enable a more accurate gas detection based on a multi-field view, while simultaneously reducing installation cost, equipment cost, process and power consumption, and space utilization. Further, at least in part because of the efficient space utilization (e.g., utilization of a single receiver as opposed to multiple receivers), various embodiments of the exemplary multi-directional open path detection system of the present invention may be utilized in areas constrained by space, thus enabling a more accurate detection in these noted areas.

In various embodiments, the set of detectors may comprise a first detector and a second detector that are each configured to receive a portion of an incoming radiation beam incident on a reflector face of the reflector. In some embodiments, a beam splitter may be utilized to split each incoming radiation beam into a first radiation beam portion and a second radiation beam portion such that the first radiation beam portion is directed towards the first detector and the second radiation beam portion is directed towards the second detector. Each detector may be configured to receive a radiation beam portion having a particular wavelength, and may be configured to generate for the received radiation beam portion an output signal, where the output signal may correspond to the intensity of the radiation beam at the particular wavelength. For example, the first detector may be configured to generate a first output signal corresponding to the intensity (e.g., intensity measure) of an incoming radiation beam at a first wavelength (e.g., sample wavelength at which a target gas absorbs the radiation), while the second detector may be configured to generate a second output signal corresponding to the intensity (e.g., intensity measure) of the same incoming radiation beam at a second wavelength (reference wavelength at which the target gas does not absorb the radiation).

In various embodiments, an exemplary detector as described herein may comprise one or more optical filters (e.g., bandpass filters, low pass filter, high pass filter, and/or the like) configured to allow the desired wavelength to pass through so as to enable measurement of the intensity of the signal at the desired wavelength. For example, the first detector may include a first optical filter configured to allow the sample wavelength to pass through and the second detector may include a second optical filter configured to allow the reference wavelength to pass through. In some embodiments, the beam splitter may be configured to split each incoming radiation beam into a first radiation beam portion having the first wavelength (e.g., sample wavelength) and a second radiation beam portion having the second wavelength (e.g., reference wavelength) such that the detectors may not comprise and/or require optical filters.

In various embodiments, a controller communicably coupled to the receiver and/or detectors may be configured to generate, based at least in part on the output signals from each detector, a detection signal that is indicative of the presence or absence of target gas(es) in the corresponding path. For example, in various embodiments, the controller may be configured to generate the detection signal for a particular incoming radiation beam incident on the receiver based at least in part on comparing the output signals from the first and second detectors for the particular incoming radiation beam, where a lower intensity at the sample wavelength relative to the reference wavelength may be indicative of the presence of a target gas. As a non-limiting example, in various embodiments, the controller may be configured to generate the detection signal for an incoming radiation beam based at least in part on determining (e.g., calculating) the difference between the output signals (e.g., difference measure) and determining whether the difference measure satisfies a difference measure threshold, where a difference measure that satisfies the difference measure threshold may be indicative of the presence of target gas(es). As another non-limiting example, in various embodiments, the controller may be configured to generate the detection signal for an incoming radiation beam signal based at least in part on determining (e.g., calculating) a ratio of the intensity of the incoming radiation beam at the sample wavelength to the intensity of the incoming radiation beam at the reference wavelength (e.g., ratio measure) and determining whether the ratio measure satisfies a ratio measure threshold, where a ratio measure that satisfies the ratio measure threshold may be indicative of the presence of target gas(es).

FIG. 1 schematically illustrates an exemplary multi-directional open path detector system 1 according to various embodiments of the present invention. In various embodiments, an exemplary multi-directional open path detector system 1 may comprise a receiver 2 and one or more transmitters 3, and may be configured to detect the presence of a gas (e.g., flammable and/or toxic gas(es)) in an area. For example, as shown in FIG. 1, an exemplary multi-directional open path detector system 1 may comprise a receiver 2 and a plurality of transmitters 3 configured to detect the presence of a gas along a plurality of beam paths defined by the receiver 2 and the plurality of transmitters 3. In various embodiments, the beam path may be a straight beam path between the receiver 2 and a corresponding transmitter 3.

In various embodiments, each transmitter 3 may comprise a radiation source (e.g., light emitting diodes (LED), laser diode, arc lamp, infrared radiation source, and/or the like) configured to emit radiation beam signals (e.g., collimated radiation beams) along a beam path. As shown in FIG. 1, each transmitter 3 may define an emitting face 32 through which one or more signals may be emitted by the transmitter 3. In various embodiments, transmitter 3 (e.g., radiation source thereof) may be configured to emit radiation beam signals having at least a particular wavelength. For example, in various embodiments, the wavelength(s) of the radiation emitted by a transmitter 3 may be selected such that the radiation comprises at least a particular wavelength (e.g., sample wavelength that would be absorbed by the target gas(es)). In various embodiments, transmitter 3 (e.g., radiation source thereof) may be configured to emit radiation beam signals having at least a first wavelength (sample wavelength that would be absorbed by the target gas(es)) and a second wavelength (reference wavelength that would not be absorbed by the target gas(es)). An exemplary transmitter 3 may include a housing 34 configured to house the radiation source and/or one or more other components (not shown) such as optical components, internal controllers, and/or the like. The one or more transmitters 3 may be configured to emit a signal (e.g., infrared radiation signal) along a beam path towards the receiver 2.

In various embodiments, each transmitter 3 may include one or more internal controllers and/or circuitry (not shown) configured to control one or more function(s) and/or operation parameters of the respective transmitter 3. In various embodiments the one or more internal controllers (e.g., transmitter internal controllers and/or circuitry) and/or circuitry may be configured to communicate with one or more external controllers. For example, in various embodiments, the one or more transmitter internal controllers and/or circuitry may be configured to communicate (e.g., wirelessly) with controller 100 (described further below). In some embodiments, each transmitter 3 (e.g., internal controller and/or circuitry thereof) may be configured to emit a radiation beam signal in response to receiving a drive signal. In some embodiments, the drive signal may be generated and transmitted by the receiver 2 (e.g., a controller and/or circuitry thereof). In some embodiments, the driver signal may not be generated and/or transmitted by the receiver 2. In various embodiments, the drive signal may be generated by a controller such as controller 100. As noted above, the transmitters 3 may be arranged in a variety of configurations (e.g., based at least in part on the receiver configuration, the application, and/or the monitored area). Each transmitter 3 may be positioned at a location (e.g., receiver location) within a monitored area and/or vicinity of a monitored area. As a non-limiting example, as shown in FIG. 1, the plurality of transmitters 3 may be spaced circumferentially around the receiver 2.

Figure 2:
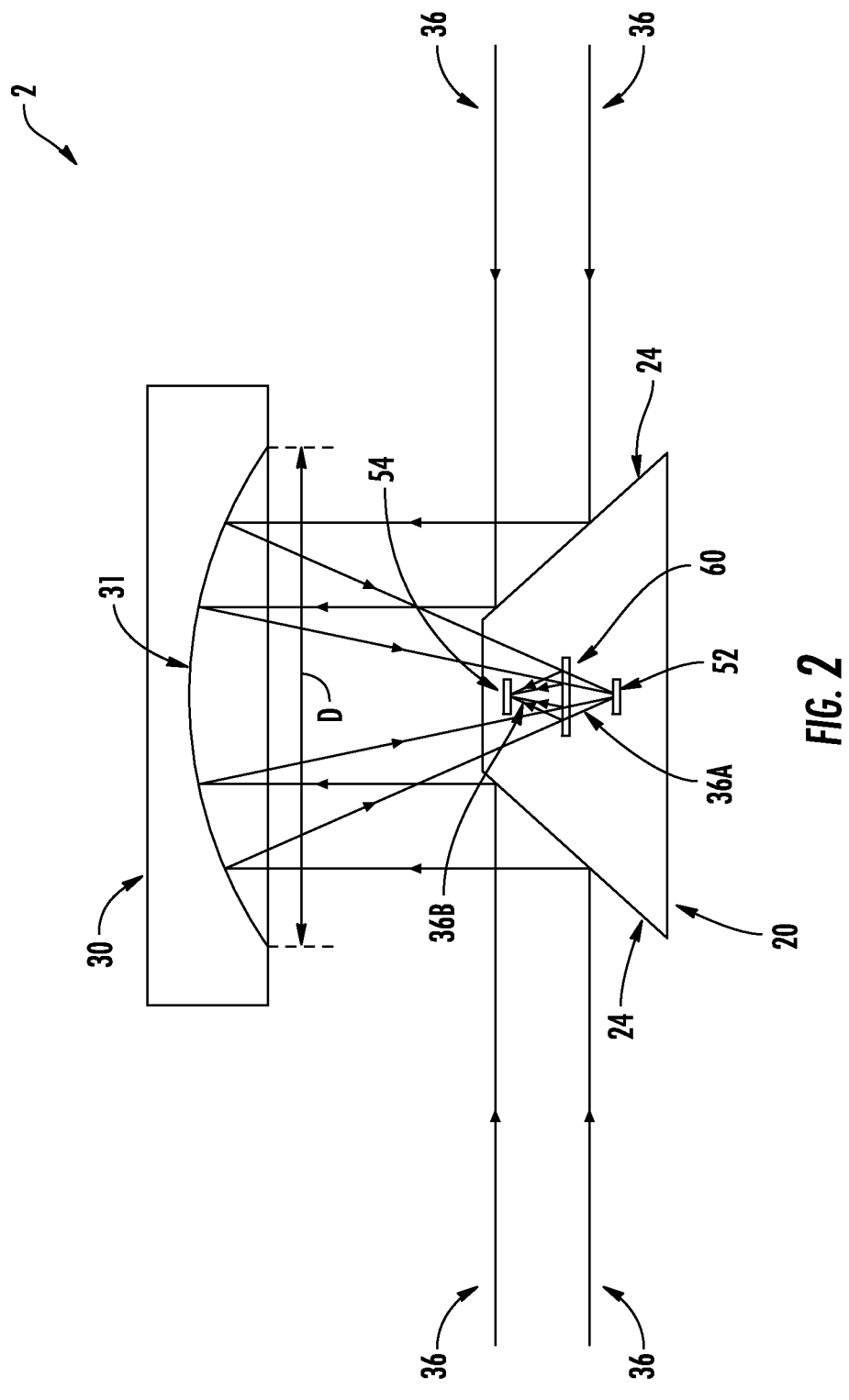
FIG. 2 schematically illustrates an exemplary receiver of an exemplary multi-directional open path detector system in accordance with various embodiments of the present invention.
Figure 3:
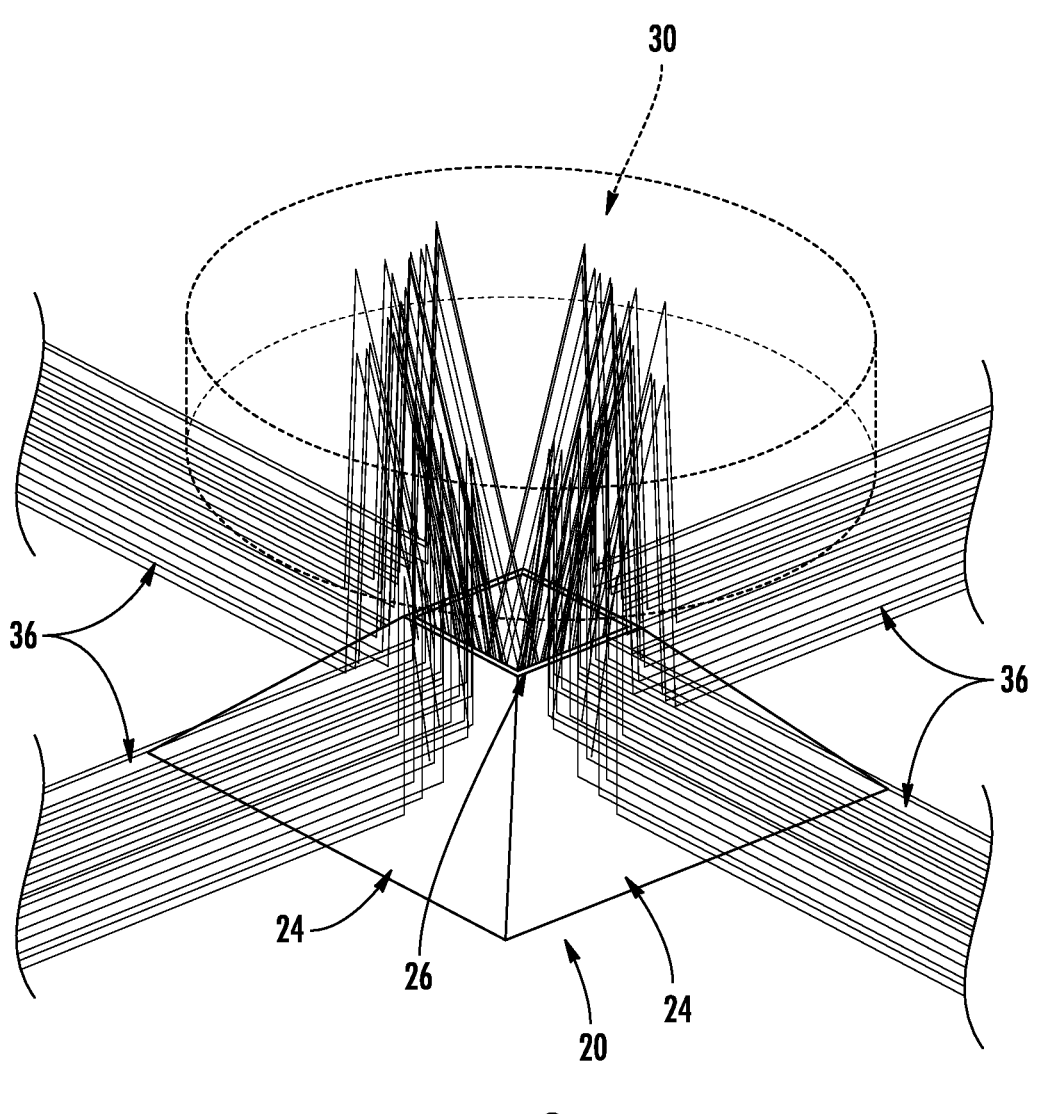
FIG. 3 illustrates a close-up view of an exemplary receiver of an exemplary multi-directional open path detector system in accordance with various embodiments of the present invention.

FIG. 2 schematically illustrates an exemplary receiver 2 according to various embodiments of the present invention, while FIG. 3 illustrates a close-up view of the receiver 2. As shown in FIG. 2, the receiver 2 may comprise a reflector element 20, an optical element 30, and a detector set (e.g., detectors 52, 54) configured to receive incoming radiation beam signals (incoming radiation beams) 36 from each of the transmitters 3, wherein an incoming radiation beam signal 36 may describe an emitted radiation beam signal incident on the reflector element 20, wherein the emitted radiation beam signal may comprise collimated radiation beam. The reflector element 20 may be communicably coupled to the optical element 30 and may be configured to direct incoming beam signals (incoming beam) to the detector via reflective communication with the optical element 30. In various embodiments, the optical element 30 may be communicably coupled to a beam splitter and/or at least one detector (e.g., detector 52, detector 54).

In various embodiments, as shown in FIGS. 2 and 3, the reflector element 20 may comprise a plurality of reflector faces 24. In various embodiments, as depicted in FIGS. 2 and 3, a reflector face 24 may be substantially flat. Additionally and/or alternatively in various other embodiments, the reflector face may comprise a curved portion.

In various embodiments, at least a portion of a reflector face 24 may comprise a mirror (e.g., a lens) configured to reflect incoming radiation beams towards the optical element 30. For example, in various embodiments, each reflector face 24 is a mirror face or otherwise comprise a mirror face. It should be understood, however, that in other embodiments, the reflector face may comprise any optical component suitable to reflect incoming radiation beam towards the optical element 30. The shape, angle of inclination, and/or angle of curvature of a reflector face 24 may be selected such that an incoming radiation beam incident on the reflector face 24 is reflected (e.g., directed) towards the optical element 30. Additionally and/or alternatively the angle of incidence of an incoming radiation beam on a reflector face may be selected such that the incoming radiation beam is reflected towards the optical element 30. For example, the source of the incoming radiation beam (e.g., transmitter) may be configured to emit radiation beams at an angle (e.g., 30°, 45°, 70°, and/or the like), such that when the radiation beam incidents on a reflector face 24 (e.g., at a desired/selected angle of incidence as noted above), the radiation beam is directed towards the optical element 30. In various embodiments, each reflector face 24 may be configured such that it may receive radiation beam signals emitted by a transmitter 3 at a receiver location. For example in various embodiments, the reflector element 20 may be configured such that the plurality of reflector faces 24 may be aligned with the plurality of transmitters 3 (e.g., emitting face 32 thereof), wherein each reflector face 24 is aligned with a different transmitter 3. For example, in various embodiments, the reflector element 20 may be configured such that the plurality of transmitters 3 may be spaced, arranged and/or distributed such that the emitting face 32 of each transmitter 3 faces a reflector face 24 of the plurality of reflector faces 24 of the reflector element 20. In this manner, the reflector element 20 (e.g., reflector faces 24 thereof) may be operable to receive incoming radiation beams from different directions (e.g., different beam path directions).

In various embodiments, each transmitter 3 and corresponding reflector face 24 may be arranged such that each transmitter 3 and corresponding reflector face 24 are at a distance from one another and maintain at least substantially horizontal configuration, wherein the emitted radiation beam may travel in a substantially horizontal plane. It should be understood, however, that in other embodiments, the one or more reflector faces 24 may be configured to receive incoming radiation beam signals at a variety of angles (e.g., 45 degrees, 60 degrees, and/or the like). For example, as noted above, in some embodiments, the one or more transmitters 3 may be configured to emit radiation signals at a 45 degree angle, a 60 degree angle, and/or the like. Further, the distance between an emitting face 32 of a transmitter 3 and a corresponding reflector face 24 can vary and may be of any suitable/desired distance (e.g., based at least in part on the application, the monitored environment, the type of transmitter, the components of the reflector element, and/or the like). As a non-limiting example, in an example application, the preferred distance between an emitting face 32 of a transmitter 3 and a corresponding reflector face 24 of a reflector element 20 is in the range of 10 ft to 330 ft. It should be understood, however, that in various embodiments, the distance between an emitting face 32 of a transmitter 3 and a corresponding reflector face 24 may be less than 10 ft or greater than 330 ft.

In various embodiments, reflector element 20 may define a plurality of sides, wherein one or more of the sides may comprise a reflector face 24. For example, in various embodiments, reflector element 20 may define at least a portion of a shape having a plurality of sides, wherein one or more sides of the plurality of sides may comprise a reflector face 24. As a non-limiting example, as shown in FIG. 3, the reflector element 20 may define at least a portion of a pyramid shape wherein each side comprises a reflector face 24. In various embodiments the reflector element 20 may define an opening 26, and may be configured to house one or more components of the receiver 2 (e.g., detectors 52, 54, beam splitter 60, and/or other components).

While FIG. 3 depicts a reflector element 20 having a pyramid shape profile with four sides, various other embodiments of the present invention may comprise a reflector element 20 having other pyramid shape profiles with n number of sides (e.g., where n=3, 4, 5, 6, 7, and/or the like), wherein one or more sides may comprise a reflector face 24. For example, in various embodiments, the reflector element 20 may comprise at least a portion of a pentagonal pyramid, a heptagonal pyramid, an octagonal pyramid, and/or the like. Further, while FIG. 3, depicts a reflector element 20 having a pyramid shape, various other embodiments of the present invention may comprise a reflector element 20 having other shape profiles. Furthermore, while FIG. 3 depicts a reflector element 20, wherein each of the sides of the reflector element 20 comprises a reflector face 24, in various other embodiments, one or more sides of the reflector element 20 may not comprise a reflector face. Moreover, the reflector element 20 may define (e.g., comprise) a shape that is different from a pyramid shape. For example, in some embodiments, the reflector element 20 may be cone-shaped (not shown), such that the reflector element comprise a single reflector face spanning the entire surface (e.g., or substantially the entire surface) of the cone-shaped reflector element. In the noted example, the cone shape of the reflector element may enable positioning/locating transmitters anywhere with respect to the monitored area, such that incoming radiation beams from different directions may incident on the single reflector face of the cone-shaped reflector element at different areas thereof, and reflected towards the optical element 30.

In various embodiments, the optical element 30 may comprise a mirror (e.g., a lens) configured to redirect incoming radiation beam (e.g., collimated radiation beam) reflected from a reflector face 24, wherein redirecting an incoming radiation beam comprises converging the incoming collimated radiation beam at a desired focal point (e.g., at a detector). The shape, focal length, aperture, f-number, and/or other parameters/characteristics of the optical element 30 may be selected such that the optical element 30 converges/concentrates the incoming radiation beam to at least one detector (e.g., detector 52 and/or detector 54). Additionally, in some embodiments, the size of the receiver (e.g., dimensions of the reflector faces) and/or the distance between the optical element 30 and the at least one detector, where the redirected radiation beams converge, may be based at least in part on the f-number of the optical element (e.g., ratio of the focal length to the aperture). As a non-limiting example, in various embodiments, the optical element 30 (e.g., at least a portion of the optical element 30) may comprise a mirror (e.g., lens) having a concave shape (e.g., spherical, aspherical, complex, and/or the like) and may be positioned above relative to the reflector element 20 such that the concave-shaped mirror (e.g., concave mirror face) faces downwardly. For example, in the illustrated embodiment of FIG. 2, the reflector faces 24 may be configured to reflect incoming radiation beams in an upward direction at about 90 degrees relative to the incoming radiation beam, and the optical element 30 may be positioned above relative to the reflector element 20 with the concave mirror face 31 facing downwardly and at a focal length, aperture, and/or f-number that enables redirection (e.g., converging/concentration) of each incoming radiation beam reflected from each reflector face 24 of the reflector element 20 towards detector 52 and/or detector 54.

As shown in FIG. 2, the aperture (e.g., a length (diameter) D of the reflecting concave mirror face) and the focal length of the concave mirror face of the optical element 30 may be selected such that each incoming radiation beam reflected from each reflector face 24 incidents on at least a portion of the concave mirror face of the optical element 30. The configuration of the receiver 2 (e.g., the shape of the reflector element 20, the angle and/or profile of the reflector faces, the shape, aperture, and/or focal length of the optical element 30, and/or the like) may be varied to achieve different field of views as further described herein. It should be understood that while in the illustrated embodiment of FIGS. 2 and 3, the optical element 30 is positioned above relative to the reflector element 20, in other embodiments, the optical element 30 may be positioned below relative to the reflector element 20 (e.g., the reflector element may comprise an upside down pyramid).

In various embodiments, the receiver 2 may include a beam splitter 60. In some embodiments, the beam splitter may comprise a partially reflecting mirror and may be configured to split each radiation beam redirected from the optical element 30 into two portions. As shown in FIG. 2, the beam splitter 60 may be positioned between the optical element 30 and at least one detector (e.g., detector 52), and may be configured to split each radiation beam redirected from the optical element 30 into a first radiation beam portion 36A (also referred to as first incoming beam portion) and a second radiation beam portion 36B (also referred to as second incoming beam portion) based at least in part on transmitting a portion of the radiation beam (e.g., corresponding to the first radiation beam portion 36A) and reflecting a portion of the radiation beam (e.g., corresponding to the second radiation beam portion 36B). In some embodiments, the first radiation beam portion 36A comprises the reference wavelength and the second radiation beam portion 36B comprises the sample wavelength, or vice versa. For example, in some embodiments, the first radiation beam portion 36A comprises the sample wavelength and the second radiation beam portion 36B comprises the reference wavelength. The orientation and/or location of each of the detectors 52, 54 and the beam splitter 60 relative to one another may be selected such that the first radiation beam portion 36A (e.g., transmitted portion) is directed to the first detector 52 and the second radiation beam portion 36B (e.g., reflected portion) is directed to the second detector 54. As a non-limiting example, as shown in FIG. 2, the beam splitter may comprise a dichroic beam splitter configured to split a radiation beam into a first radiation beam portion having the reference wavelength and a second radiation beam having the sample wavelength, or vice versa (as described above). In some embodiments, the beam splitter may comprise a plate beam splitter, a cube beam splitter, and/or other suitable beam splitters.

As noted above, in some embodiments, the beam splitter 60 and the detectors 52, 54 may be housed within a housing defined/formed by the reflector element 20. In the noted exemplary embodiments, the optical element 30 may be configured to redirect the reflected incoming radiation beam signals (incoming radiation beam) from the reflector faces 24 of the reflector element 20 through the opening 26 defined by the reflector element housing. In some embodiments, the beam splitter 60 and the detectors 52, 54 may not be located within the reflector element 20. For example, in some embodiments, the reflector element 20 may not define an opening and may not house the beam splitter 60 and/or the detectors 52, 54. In some embodiments, the reflector element 20 may house one or more of the beam splitter 60, the first detector 52, or the second detector 54. In various embodiments, one or more components of the receiver 2 (as described herein) may be supported using a mechanical mount, such as a spider mounting system. In some embodiments, at least a portion of the mechanical mount (e.g., spider mounting system) is positioned between the optical element 30 and the reflector element 20. In some embodiments, at least a portion of the mechanical mount is positioned within the reflector element 20.

As described above, in some embodiments, the beam splitter may be configured to split each radiation beam redirected from the optical element 30 into a first radiation beam portion 36A having a first wavelength (e.g., sample wavelength) and a second radiation beam portion 36B having a second wavelength (e.g., reference wavelength), or vice versa. Additionally and/or alternatively, in some embodiments, the receiver 2 may comprise one or more optical filters such as a bandpass filter, low pass filter, a high pass filter, and/or the like configured to select a desired wavelength (e.g., sample wavelength or reference wavelength) based at least in part on allowing the desired wavelength (e.g., sample wavelength or reference wavelength) to pass through and removing and/or reflecting other wavelengths. For example, in some embodiments, the receiver 2 may comprise a beam splitter (e.g., a plate beam splitter) configured to split each radiation beam redirected from the optical element 30 into a first radiation beam portion and a second radiation beam portion, wherein each of the first and second radiation beam portions comprise both the sample wavelength and the reference wavelength. In the noted example embodiment, a first optical filter (not shown) may be positioned in front of the first detector 52 and a second optical filter (not shown) may be positioned in front of the second detector 54, wherein the first optical filter is configured to allow the first radiation beam portion at the sample wavelength to pass through and the second optical filter is configured to allow the second radiation beam portion at the reference wavelength to pass through (or vice versa). In some embodiments, the first detector 52 may include the first optical filter (as describe above) and the second detector 54 may include the second optical filter (as described above).

Each detector 52, 54 may comprise a spectral detector and may be configured to generate an output signal for each radiation beam redirected from the optical element 30, (corresponding to the incoming radiation beam signal incident on a reflector face 24). For example, in various embodiments, the detectors 52, 54 may comprise a photodiode and/or other device configured for measuring the intensity of a radiation beam signal. In various embodiments, each detector 52, 54 may be configured to generate an output signal based at least in part on the respective radiation beam portion incident on the detectors 52, 54. For example, the first detector 52 may be configured to generate an output signal based at least in part on the first radiation beam portion having the sample wavelength, wherein the first output signal corresponds to/represents the intensity of the corresponding incident radiation beam at the sample wavelength, and the second detector 54 may be configured to generate a second output signal based at least in part on the second radiation beam portion having the reference wavelength, wherein the second output signal corresponds to/represents the intensity of the corresponding incident radiation beam at the reference wavelength. In various embodiments, a detector signal circuitry of a controller (e.g., controller 100) may be configured to analyze and/or process the output signals generated by the detectors 52, 54 to determine the presence of target gas(es) in the area.

Figure 4:
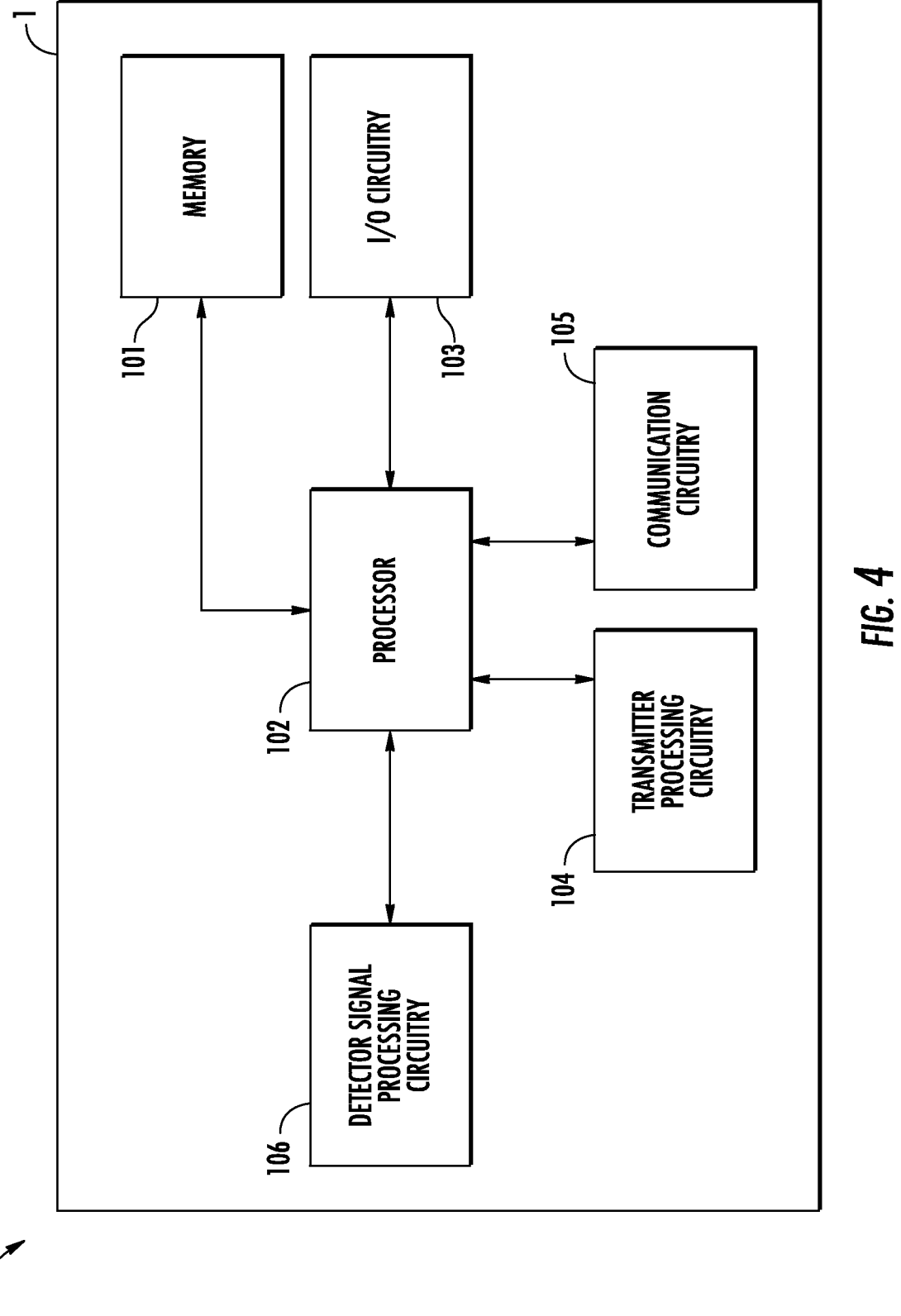
FIG. 4 illustrates an exemplary apparatus for implementing various embodiments of the present disclosure.

In various embodiments, the receiver 2, the set of detectors 52, 54, the reflector element 20, and/or the transmitters 3 may be communicably coupled to a controller 100. In some embodiments, the receiver 2 may comprise controller 100. As illustrated in FIG. 4, the controller 100 may comprise a memory 101, a processor 102, input/output circuitry 103, communication circuitry 105, transmitter processing circuitry 104, and detector signal processing circuitry 106. The controller 100 may be configured to execute one or more of the various operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 100 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 100 may provide or supplement the functionality of particular circuitry. For example, the processor 102 may provide processing functionality, the memory 101 may provide storage functionality, the communications circuitry 105 may provide network interface functionality, and the like.

In some embodiments, the processor 102 (and/or co-processor or any other processing circuitry assisting or otherwise associated with the processor) may be in communication with the memory 101 via a bus for passing information among components of the apparatus. The memory 101 may be non-transitory and may include, for example, one or more volatile and/or non-volatile memories. For example, the memory 101 may be an electronic storage device (e.g., a computer readable storage medium). In various embodiments, the memory 101 may be configured to store information, data, content, applications, instructions, or the like, for enabling the apparatus to carry out various functions in accordance with example embodiments of the present disclosure. It will be understood that the memory 101 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 101 may be configured to store transmitter signal data, gas detection data, system historical data, an/or the like.

The processor 102 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 101 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed. For example, in various embodiments, the processor 102 may comprise drive circuitry configured to generate a signal. For example, the drive circuitry may be configured to generate a signal defined at least in part by one or more predetermined signal characteristics, such as, for example, a signal frequency, to be received by a transmitter 3, wherein the signal may cause the transmitter 3 to emit a radiation beam signal towards a reflector face 24 of the receiver 2, as described herein.

In some embodiments, the controller 100 may include input-output circuitry 103 that may, in turn, be in communication with the processor 102 to provide output to the user and, in some embodiments, to receive input such as a command provided by the user. The input-output circuitry 103 may comprise a user interface, such as a graphical user interface (GUI), and may include a display that may include a web user interface, a GUI application, a mobile application, a client device, or any other suitable hardware or software. In some embodiments, the input-output circuitry 103 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 102, input-output circuitry 103 (which may utilize the processing circuitry), or both may be configured to control one or more functions of one or more user interface elements through computer-executable program code instructions (e.g., software, firmware) stored in a non-transitory computer-readable storage medium (e.g., memory 101). Input-output circuitry 103 is optional and, in some embodiments, the controller 100 may not include input-output circuitry. For example, where the controller 100 does not interact directly with the user, the controller 100 may generate user interface data for display by one or more other devices with which one or more users directly interact and transmit the generated user interface data to one or more of those devices. For example, the controller 100, using user interface circuitry may generate user interface data for display by one or more display devices and transmit the generated user interface data to those display devices.

The communications circuitry 105 may be a device or circuitry embodied in either hardware or a combination of hardware and software that is configured to receive and/or transmit data from/to a network and/or any other device, circuitry, or module in communication with the system 1. For example, the communications circuitry 105 may be configured to communicate with one or more computing devices via wired (e.g., USB) or wireless (e.g., Bluetooth, Wi-Fi, cellular, and/or the like) communication protocols.

In various embodiments, the processor 102 may be configured to communicate with the transmitter processing circuitry 104. The transmitter processing circuitry 104 may be a device or circuitry embodied in either hardware or a combination of hardware and software that is configured to receive, process, generate, and/or transmit data, such as transmitter signal data generated by one or more detectors. In various embodiments, the transmitter processing circuitry 104 may be configured to receive and/or retrieve transmitter signal data from one or more transmitters. As described herein, in various embodiments, the transmitter signal data received by the transmitter processing circuitry 104 may comprise, for example, one or more signal data for one or more emitted radiation beam signal produced/generated by a transmitter.

The transmitter processing circuitry 104 may be configured to control the acquisition of beam signals from one or more transmitters. For example, the transmitter processing circuitry 104 may be communicably coupled to the transmitters and configured to provide a signal (e.g., drive signal) to the transmitters to cause emission of radiation beam signals by the transmitters. In various embodiments, the transmitter processing circuitry 104 may be configured to control the sequence of emission of radiation beams from one or more transmitters. For example, in various embodiments, the transmitter processing circuitry 104 may be configured to control one or more transmitters to emit radiation beams sequentially based at least in part on a time-delay scheme/protocol and/or other suitable schemes/protocols for enabling sequential emission of one or more transmitters. As a non-limiting example, the transmitter processing circuitry 104 may be configured to cause a first transmitter to emit a first radiation beam at time t1 and cause a second transmitter 3 to emit a second radiation beam at time t2 after a delay. Further, continuing with the example, the transmitter processing circuitry 104 may be configured to cause a third transmitter to emit a third radiation beam at a time t3 after another delay and may continue this process until all transmitters have been caused to emit radiation beam. Furthermore, the transmitter processing circuitry 104 may again repeat the above process. As another non-limiting example, the transmitter processing circuitry 104 may be configured to cause the transmitters (e.g., radiation sources thereof) to emit radiation beam at predetermined intervals.

In various embodiments, the processor 102 may be configured to communicate with the detector signal processing circuitry 106. The detector signal processing circuitry 106 may be a device or circuitry embodied in either hardware or a combination of hardware and software that is configured to receive, process, generate, and/or transmit data, such as detector signal data (e.g., output signal data) generated by one or more detectors. In various embodiments, the detector signal processing circuitry 106 may be configured to receive and/or retrieve detector signal data from a set of detectors. As described herein, in various embodiments, the detector signal data (e.g., detection signal) received by the detector signal processing circuitry 106 may comprise, for example, one or more signal data (e.g., intensity/signal strength) for one or more emitted radiation beam signals produced/generated by a transmitter.

In various embodiments, detector signal processing circuitry 106 may be configured to distinguish signal data (e.g., intensity) for a first radiation beam produced by a first transmitter from signal data produced for a second radiation beam by a second transmitter, based at least in part on a signal analysis process and/or processes. Further, in various embodiments, the detector signal processing circuitry 106 may be configured to execute one or more signal analysis processes and/or processes to detect and/or calculate attenuation in signal intensity based at least in part on output data (e.g., intensity data/signal) received from one or more detectors, to generate a detection signal that may be indicative of the presence of gas in an area. For example, the controller 100 may be configured to analyze and/or process the output signals from a set of detectors based at least in part on comparing the output signals (e.g., the intensity measured by a first detector at a sample wavelength to the intensity measured by a second detector at a reference wavelength). In various embodiments, detector signal processing circuitry 106 may be configured to execute one or more signal analysis processes and/or data transformation operations so as to process at least a portion of the detector signal data into formatted data that may be communicated to one or more external devices.

In various embodiments, the detector signal processing circuitry 106 may be configured to execute one or more of the operations described herein at two or more instances, so as to facilitate the receiving, processing, generating, and/or transmitting of signal data at various instances (e.g., runtimes) over time. In various embodiments, the detector signal processing circuitry 106 may be configured to store at least a portion of the resultant data corresponding to one or more of the operations described herein as historical system data that, for example, may be associated with one or more instances (e.g., an installation instance, a particular runtime). In such an exemplary circumstance, the detector signal processing circuitry 106 may be configured to access at least a portion of the historical system data (e.g., via the memory 101) in order to facilitate the execution of one or more operations described herein.

In various embodiments, the multi-directional open path detector system 1 may be connected to a power supply (not shown) configured to receive power and power the various components of the multi-directional open path detector system 1. As non-limiting examples, the power supply may comprise one or more batteries, one or more capacitors, one or more constant power supplies (e.g., a wall outlet) and/or the like.

As noted above, the configuration of the receiver 2 may be varied to achieve different field of views (e.g., customized field of views). In some embodiments, the configuration and/or orientation of the receiver 2 may be based at least in part on the direction and/or angle of the beam path between the transmitters 3 and the reflector faces 24 of the reflector element 20. In some embodiments, the direction and/or angle of the beam path between the transmitters 3 and the reflector faces 24 of the reflector element 20 may be selected based at least in part on the configuration of the receiver 2. (e.g., the configuration of the reflector element 20 and/or the optical element 30)

Figure 5A:
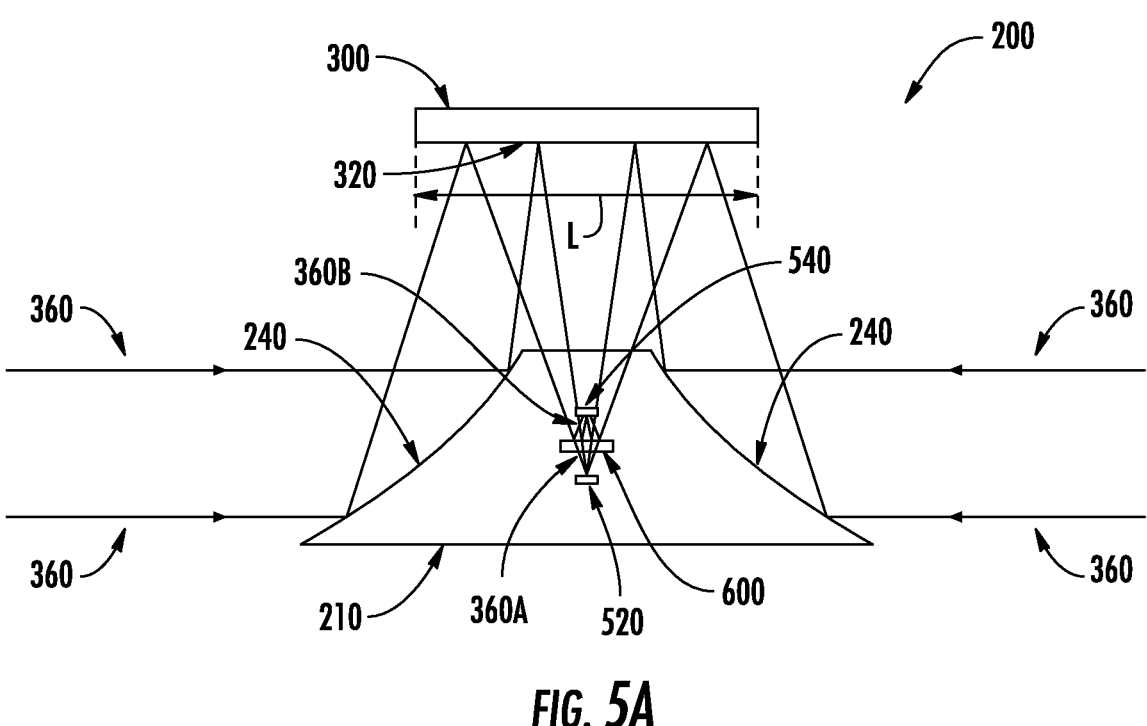
FIG. 5A schematically illustrates another exemplary receiver of a multi-directional open path detector system in accordance with various embodiments of the present invention.

FIG. 5A schematically illustrates another exemplary receiver 200 of a multi-directional open path detector system

1 according to various embodiments of the present invention. As shown in FIG. 5A, the receiver 200 may comprise a reflector element 210, an optical element 300, and a set of detectors 520, 540 configured to receive incoming radiation beam signals 360 (e.g., at least a portion of each incoming radiation beam signal) from each of the transmitters 3 (as described above).

Figure 5B:
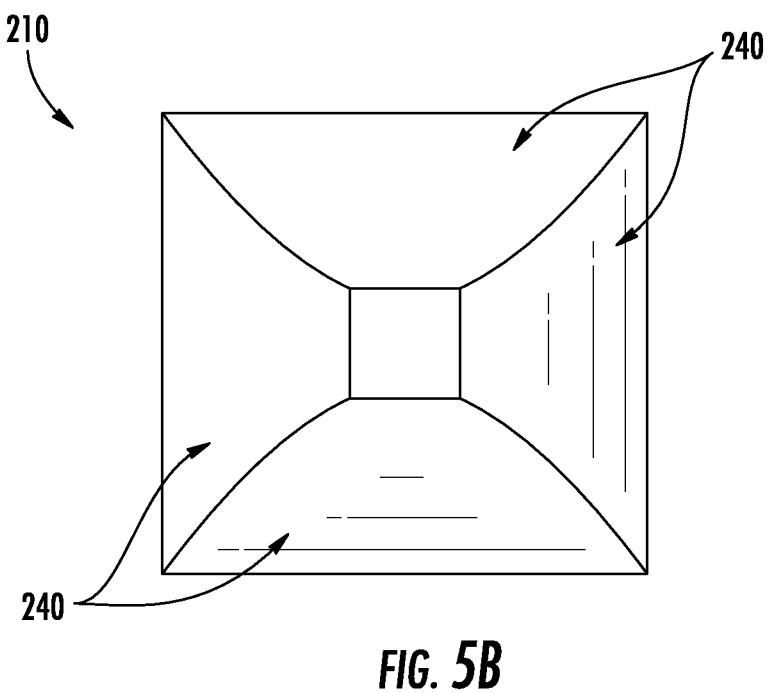
FIG. 5B schematically illustrates a top view of an exemplary reflector element of an exemplary receiver in accordance with various embodiments of the present invention.

In various embodiments, reflector element 210 may comprise a plurality of reflector faces 240 (e.g., one or more mirrors) configured to reflect incoming beam signals (incoming beam) towards the optical element 300 of the receiver 200. FIG. 5B schematically illustrates a top view of an exemplary reflector element 210. As shown, in FIGS. 5A and 5B, the reflector faces 240 may comprise at least a portion thereof having a curved reflecting surface (e.g., curved mirror face), such that collimated incoming beam signal 360 incident on the reflector faces 240 may be reflected towards the optical element 300 at an angle (e.g., greater than 90 degrees) relative to the incident radiation beam. As a non-limiting example, as shown in FIG. 5A and in various embodiments, the optical element 300 may comprise a flat mirror. For example, the optical element 300 may comprise a substantially flat mirror face 320 orientated such that the incoming radiation beams reflected from each reflector face 240 incidents on the mirror face of optical element 300. For example, the mirror face 320 may have a length L, such that each reflected incoming radiation beam incident on a reflector face 240 is reflected towards the mirror face 320. The optical element 300 (e.g., mirror face thereof) may be configured to redirect (e.g., converge/concentrate) the reflected incoming radiation beam 360 towards at least one detector (e.g., detector 520 and/or detector 540) via a beam splitter 600 (similar to beam splitter 60). The beam splitter 600 may be configured to split a redirected radiation beam into a first radiation beam portion 360A and a second radiation beam portion 360B as described above with reference to FIG. 2, and may be configured to direct the first and second radiation beam portions 360A, 360B to the detectors 520 and 540 (as described above with reference to FIG. 2).

As noted above, it should be understood that in various other embodiments, the various components (as described herein) of the optical element 300 and/or the reflector element 210 may comprise a variety of shapes. For example, in some embodiments, the reflector faces of the reflector element may comprise a flat shape (e.g., substantially flat), while the optical element comprise a curved shape. In some embodiments, both the reflector faces of the reflector element and the optical element may comprise a curved shape. In some embodiments, the reflector faces of the reflector element may comprise a curved shape, while the optical element comprises a flat shape (e.g., substantially flat shape).

Figure 6:
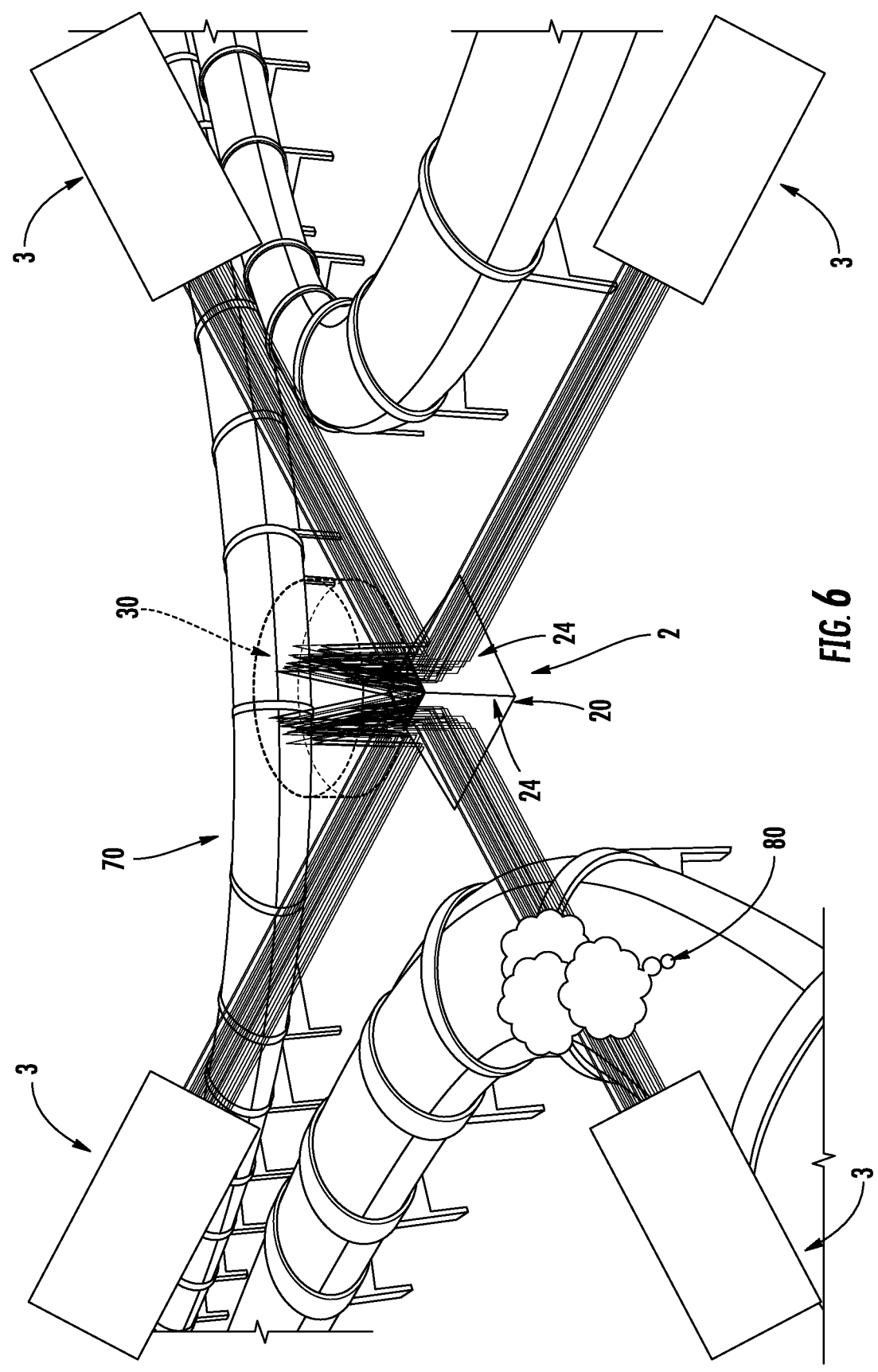
FIG. 6 illustrates an operational example of a multi-directional open path detector system in accordance with various embodiments of the present invention.

FIG. 6 illustrates an exemplary operation of a multi-directional open path detector system 1 according to various embodiments of the present invention. As shown in FIG. 6, a receiver and a plurality of transmitters may be arranged in a monitored area, such as a gas pipeline environment. As a non-limiting example, as depicted in FIG. 6, the exemplary multi-directional open path detector system 1 may be utilized to detect a gas leakage 80 from a pipeline 70. The gas can include any number of gases (e.g., methane, ammonia, hydrocarbons, and/or other gases). A controller (e.g., controller 100) communicatively coupled to the receiver 2 and/or the plurality of transmitters 3 may transmit drive signals to the transmitters 3 sequentially to cause emission of radiation beam signals by the transmitters. In some embodiments, the controller may form a portion of the receiver 2. Each emitted radiation beam may travel through a beam path to a reflector face 24 of the reflector element 20 of the receiver 2, wherein each transmitter emits radiation signal (e.g., collimated radiation beam) in a beam path direction that is different from other transmitters of the plurality of transmitters. The incoming radiation beam incident on a reflector face 24 may be reflected by the reflector face 24 towards an optical element 30. The optical element 30 may redirect (e.g., converge/concentrate/focus) the reflected incoming radiation beam via a beam splitter 60 (as described with reference to FIG. 2) to a first detector and a second detector, wherein the first detector 52 (as described with reference to FIG. 2) may receive a first radiation beam portion at a first wavelength (sample wavelength) and the second detector 54 (as described with reference to FIG. 2) may receive a second radiation beam portion at a second wavelength (reference wavelength). The first detector may generate a first output signal (e.g., signal intensity at sample wavelength) based at least in part on measuring the intensity of the first radiation beam portion, and the second detector may generate a second output signal (e.g., signal intensity at the reference wavelength) based at least in part on measuring the intensity of the second radiation beam portion. A controller (e.g., controller 100) coupled to (or forming a portion thereof) the receiver 2 may receive each output signal (e.g., first and second output signals) and process and/or analyze the output signals to generate a detection signal, based at least in part on the output signals (e.g., ratio measure and/or difference measure as described above), that may be indicative of the presence of the leaked gas 80 (e.g., detected gas) in the area.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A multi-directional open path detector system comprising:
   a plurality of transmitters, wherein each transmitter is configured to emit a beam signal in a beam path, and wherein each beam path direction is different for each transmitter of the plurality of transmitters;
   a receiver at a receiver location, wherein the receiver is positioned in the beam path for each transmitter of the plurality of transmitters and configured to receive, for each transmitter, an incoming beam corresponding to the emitted beam signal by the respective transmitter, the receiver comprising:
   an optical element;
   at least one detector; and
   a reflector element in reflective communication with the optical element, wherein the reflector element comprises a plurality of reflector faces, wherein each transmitter of the plurality of transmitters is aligned with a reflector face of the plurality of reflector faces, and wherein each reflector face is configured to direct the incoming beam from the corresponding transmitter to the optical element, wherein for each transmitter:

the reflector element is configured to direct the incoming beam towards the optical element,
the optical element is configured to redirect the incoming beam towards the at least one detector, and
the at least one detector is configured to generate an output signal based at least in part on the incoming beam; and
a controller communicably coupled to the receiver, wherein the controller is configured to generate a detection signal based at least in part on the output signal, wherein the detection signal is indicative of presence of a detected gas.

2. The multi-directional open path detector system of claim 1, wherein the plurality of transmitters are spaced circumferentially around the receiver.

3. The multi-directional open path detector system of claim 1, wherein the reflector element comprises a pyramid shape.

4. The multi-directional open path detector system of claim 1, wherein the optical element comprises a concave mirror.

5. The multi-directional open path detector system of claim 1, wherein the optical element comprises a flat mirror.

6. The multi-directional open path detector system of claim 1, wherein the plurality of transmitters are configured to emit the beam signals in a sequential order.

7. The multi-directional open path detector system of claim 1, wherein the receiver further comprises a beam splitter communicably coupled to the optical element, wherein the beam splitter is configured to split each incoming beam that is redirected towards the at least one detector into a first incoming beam portion and a second incoming beam portion.

8. The multi-directional open path detector system of claim 1, wherein the at least one detector comprises a first detector and a second detector, and wherein the first detector is configured to receive a first incoming beam portion having a first wavelength and the second detector is configured to receive a second incoming beam portion having a second wavelength.

9. The multi-directional open path detector system of claim 1, wherein the beam path between the receiver and each transmitter is a straight beam path.

10. The multi-directional open path detector system of claim 1, wherein, the beam signal emitted by each transmitter comprises infrared radiation.

11. The multi-directional open path detector system of claim 1, wherein the output signal generated by the at least one detector comprises an intensity measure.

12. The multi-directional open path detector system of claim 1, wherein the controller is configured for wireless communication of the detection signal to one or more external devices.

13. A receiver for a multi-directional open path detector comprising:
   at least one detector;
   a controller communicably coupled to the at least one detector;
   an optical element; and
   a reflector element in reflective communication with the optical element, wherein the reflector element comprises a plurality of reflector faces, wherein each reflector face is configured for being aligned with a transmitter of a plurality of transmitters, and wherein each reflector face is configured to direct the incoming beam from the corresponding transmitter to the at least one detector, wherein for each transmitter:

the reflector element is configured to direct incoming beam from a transmitter towards the optical element;

the optical element is configured to redirect the incoming beam towards the at least one detector;

the at least one detector is configured to generate an output signal based at least in part on the incoming beam;

and the controller is configured to generate a detection signal based at least in part on the output signal, wherein the detection signal is indicative of presence of a detected gas.

14. The receiver of claim 13, wherein the reflector element comprises a pyramid shape.

15. The receiver of claim 13, wherein the optical element comprises a concave mirror.

16. The receiver of claim 13, wherein the optical element comprises a flat mirror.

17. A method for detecting gas in a region, the method comprising:

aligning a receiver with a plurality of transmitters;

receiving incoming beam, by the receiver, from each transmitter of the plurality of transmitters, wherein the receiver comprises an optical element, at least one detector, and a reflector element in reflective communication with the optical element, wherein the reflector element comprises a plurality of reflector faces, wherein each transmitter of the plurality of transmitters is aligned with a reflector face of the plurality of reflector faces, and wherein each reflector face is configured to direct the incoming beam from the corresponding transmitter to the optical element; and for each transmitter:

redirecting the received incoming beam towards the optical element; and generating a detection signal, by the at least one detector; based at least in part on the redirected incoming beam received from the optical element.

18. The method of claim 17, wherein each incoming beam is received sequentially.

\* \* \* \* \*